(12) United States Patent
Rallings (10) Patent No.: US 11,459,054 B2
(45) Date of Patent: Oct. 4, 2022

(54) FOLDABLE BICYCLE AND METHOD OF TRANSPORTING A FOLDABLE BICYCLE

(71) Applicant: Alan Rallings, Dorchester (GB)

(72) Inventor: Alan Rallings, Dorchester (GB)

( * ) Notice: Subject to any disclaimer, the term of this patent is extended or adjusted under 35 U.S.C. 154(b) by 385 days.

(21) Appl. No.: 16/620,631

(22) PCT Filed: Jun. 8, 2018

(86) PCT No.: PCT/GB2018/000092
§ 371 (c)(1),
(2) Date: Dec. 9, 2019

(87) PCT Pub. No.: WO2018/224796
PCT Pub. Date: Dec. 13, 2018

(65) Prior Publication Data
US 2020/0198719 A1 Jun. 25, 2020

(30) Foreign Application Priority Data

Jun. 10, 2017 (GB) .................................... 1709279

(51) Int. Cl.
*B62K 15/00* (2006.01)
*B62J 19/00* (2006.01)
(Continued)

(52) U.S. Cl.
CPC ............. *B62K 15/006* (2013.01); *B62J 19/00* (2013.01); *B62J 50/10* (2020.02); *B62K 3/02* (2013.01);
(Continued)

(58) Field of Classification Search
CPC .. B62K 15/006; B62K 2015/003; B62K 3/02; B62M 6/75
(Continued)

(56) References Cited

U.S. PATENT DOCUMENTS 3,329,444 A * 7/1967 Lidov ...................... B62K 3/00
156/112
5,351,979 A * 10/1994 Langen .................. B62K 21/00
280/270
(Continued)

FOREIGN PATENT DOCUMENTS

CN 104386200 A * 3/2015 .............. B62M 6/75
CN 106005187 A * 10/2016
(Continued)

OTHER PUBLICATIONS

CN-106379480-A English Translation of Description Retrieved from Espacenet (Year: 2022).*
(Continued)

*Primary Examiner* — Jacob D Knutson
*Assistant Examiner* — Myles A Harris
(74) *Attorney, Agent, or Firm* — Richard M. Goldberg (57) ABSTRACT

A foldable bicycle (100) having a riding configuration and a folded configuration includes a first wheel (102) and a second wheel (104) interconnected by a frame (106). At least the first wheel (102) has an open centre (108) and includes an annular rotor (110) engageable with the ground in the riding configuration of the bicycle (100) and an annular stator (114) carrying the annular rotor (110), and the frame (106) has a pivotal connection with the stator (114) of the first wheel (102) whereby the frame (106) is pivotable relative to the first wheel (102) for folding the bicycle (100). The frame (106) and the second wheel (104) connected thereto are together so dimensioned and arranged to fit within the open centre (108) of the first wheel (102) in the folded configuration of the bicycle (100).

14 Claims, 9 Drawing Sheets

(51) Int. Cl.
  *B62M 1/38*   (2013.01)
  *B62J 50/10*  (2020.01)
  *B62K 3/02*   (2006.01)
  *B62K 11/10*  (2006.01)
  *B62M 6/75*   (2010.01)
  *B65D 85/68*  (2006.01)
  *B60B 19/00*  (2006.01)

(52) U.S. Cl.
  CPC .............. *B62K 11/10* (2013.01); *B62M 6/75* (2013.01); *B65D 85/68* (2013.01); *B60B 19/00* (2013.01); *B62K 2015/003* (2013.01); *B62K 2204/00* (2013.01); *B62M 1/38* (2013.01); *B65D 2585/6862* (2013.01)

(58) Field of Classification Search
  USPC .................................................. 280/278, 287
  See application file for complete search history.

(56) References Cited

U.S. PATENT DOCUMENTS

| | | | | |
|---|---|---|---|---|
| 8,371,659 | B2 * | 2/2013 | Fitzsimons | B60B 21/062 |
| | | | | 152/277 |
| 8,523,212 | B2 * | 9/2013 | Ryan | B62J 25/06 |
| | | | | 280/287 |
| 9,415,823 | B2 * | 8/2016 | Jayasuriya | B62H 3/12 |
| 10,870,459 | B2 * | 12/2020 | Chen | B62H 1/12 |
| 2006/0175797 | A1 * | 8/2006 | Sanders | B62K 15/006 |
| | | | | 280/287 |
| 2011/0181014 | A1 | 7/2011 | Ryan et al. | |
| 2012/0319377 | A1 | 12/2012 | Sada | |
| 2013/0277941 | A1 * | 10/2013 | Ryan | B62K 15/008 |
| | | | | 280/278 |
| 2013/0319781 | A1 * | 12/2013 | Carolin | B62M 6/75 |
| | | | | 301/6.9 |
| 2016/0137258 | A1 * | 5/2016 | Alvarez-Icaza | B62M 29/00 |
| | | | | 280/270 |
| 2016/0288857 | A1 * | 10/2016 | Boutakis | B62K 3/10 |

FOREIGN PATENT DOCUMENTS

| | | | | | |
|---|---|---|---|---|---|
| CN | 106080913 | A | * | 11/2016 | |
| CN | 106364612 | A | | 2/2017 | |
| CN | 106364613 | A | * | 2/2017 | |
| CN | 106379480 | A | * | 2/2017 | |
| CN | 106585268 | A | * | 4/2017 | |
| CN | 106697167 | A | | 5/2017 | |
| CN | 107298149 | A | * | 10/2017 | |
| CN | 107839808 | A | * | 3/2018 | ............... B62K 1/00 |
| CN | 108860421 | A | * | 11/2018 | ............... B62J 99/00 |
| CN | 109204652 | A | * | 1/2019 | ............. B62K 15/00 |
| CN | 109606524 | A | * | 4/2019 | ........... B62K 15/006 |
| CN | 112572673 | A | * | 3/2021 | |
| DE | 102012022352 | A1 | * | 5/2014 | ............... B62M 6/75 |
| ES | 2704646 | A1 | * | 3/2019 | ........... B62K 15/006 |
| FR | 656529 | A | * | 5/1929 | |
| GB | 2038735 | A | * | 7/1980 | ........... B62K 15/006 |
| GB | 2232131 | A | * | 12/1990 | ........... B62K 15/006 |
| GB | 2529523 | A | * | 2/2016 | ............. B62K 15/00 |
| GB | 2529523 | A | | 2/2016 | |
| GB | 2568228 | A | * | 5/2019 | ................. A61H 3/04 |
| KR | 0045811 | A | | 4/2014 | |
| KR | 20140045811 | A | * | 4/2014 | |
| WO | WO-2010127456 | A1 | * | 11/2010 | ........... B62K 15/006 |

OTHER PUBLICATIONS

ES-2704646-A1 English Translation of Description Retrieved from Espacenet (Year: 2022).*
GB-2232131-A English Translation of Description Retrieved from Espacenet (Year: 2022).*

* cited by examiner

FOLDABLE BICYCLE AND METHOD OF TRANSPORTING A FOLDABLE BICYCLE

BACKGROUND OF THE INVENTION

This invention concerns a foldable bicycle, more particularly a bicycle having at least one wheel with an open centre into which other parts of the bicycle may be folded when the bicycle is not being ridden.

Such a wheel has a completely open centre: instead of the conventional arrangement of a central hub rotatably mounted upon an axle and connected to an annular rim by spokes, the rim runs (directly or through bearings) on an annular carrier of comparable diameter to the rim which is like the rim open across its diameter. Thus, generally expressed, such a wheel comprises an annular rotor (normally fitted with a tyre) carried on an annular stator. A wheel of this kind may be variously called "centreless", "hubless" or "spokeless".

There have been previous proposals for a foldable bicycle having at least one wheel with an open centre into which other parts of the bicycle may be folded when the bicycle is not being ridden. One example, disclosed in British patent application GB2529523 (Ford), comprises a foldable bicycle having a front wheel with an open centre and a rear wheel smaller than the front wheel and able to nest within the front wheel when the bicycle is folded. Another example is in United States patent application US2012319377 (Sada), which discloses a foldable bicycle with spokeless wheels which accommodate the frame of the bicycle when it is folded. However, Sada requires the wheels of the bicycle to be removed when it is folded, which is inconvenient both in folding the bicycle and in returning it to its riding configuration.

SUMMARY OF THE INVENTION

The present invention provides improvements over Ford and Sada.

Thus according to a first aspect of the invention there is provided a foldable bicycle having a riding configuration and a folded configuration, which bicycle comprises a first wheel and a second wheel interconnected by a frame, wherein at least the first wheel has an open centre of diameter D and comprises an annular rotor engageable with the ground in the riding configuration of the bicycle and an annular stator carrying the annular rotor, and wherein the frame has a pivotal connection with the stator of the first wheel whereby the frame is pivotable relative to the first wheel for folding the bicycle, characterised in that the frame and the second wheel connected thereto have a combined length L that is smaller than D, whereby in the folded configuration of the bicycle the frame and the second wheel connected thereto together fit within the open centre of the first wheel.

The bicycle of the present invention is more compact than Ford in its folded configuration because the assembly of frame and second wheel fits within the open centre of the first wheel, whereas in Ford the frame lies alongside the nested wheels and thereby increases the transverse dimension of the folded bicycle. The bicycle of the present invention is more convenient than Sada because the second wheel fits within the open centre of the first wheel whilst remaining connected to the frame, whereas in Sada the wheels have to be removed to fold the bicycle. (This feature of the present invention is secured by providing that the overall length of the assembly of frame and second wheel is less than the internal diameter of the first wheel).

For additional convenience and cleanliness the bicycle of the present invention may be accommodated in a bag when in its folded configuration, eg for efficient storage or when the folded bicycle is required to be placed in the boot of a car or in the luggage rack of an omnibus or train. To this end, a second aspect of the invention provides a method of transporting the bicycle when folded, which method comprises placing the bicycle in its folded configuration into a bag dimensioned and arranged to fit the folded bicycle and having a first opening whereby the folded bicycle may be handled and a second opening whereby the rotor of the first wheel projects for wheeling the folded bicycle.

BRIEF DESCRIPTION OF THE DRAWINGS

The invention will now be described by way of example only with reference to the accompanying drawings which are purely schematic and in which—

DETAILED DESCRIPTION

Figure 1:
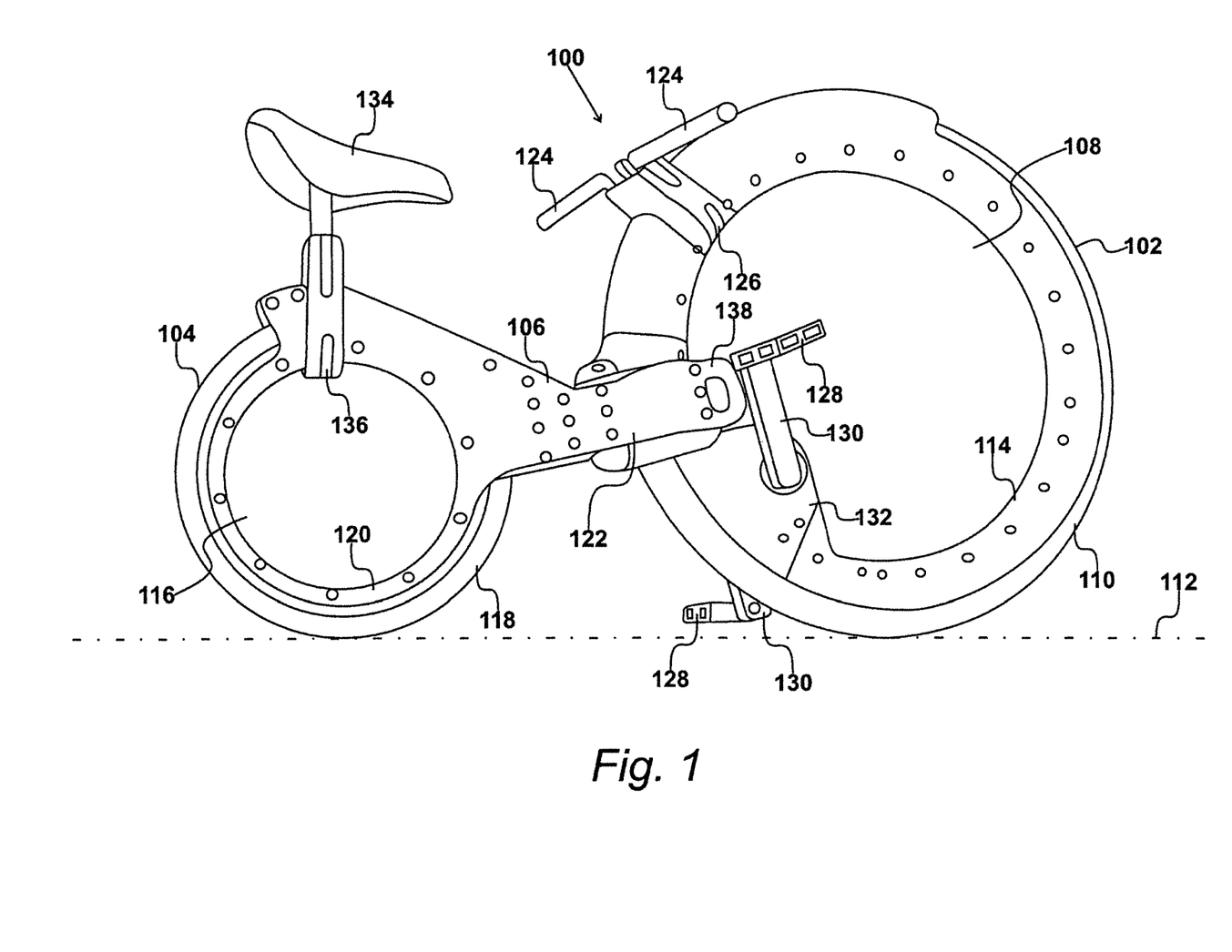
FIG. 1 illustrates a foldable bicycle embodying the invention, in its riding configuration.

Referring first to FIG. 1 this shows a foldable bicycle indicated generally at 100 and having a first (front) wheel 102 and a second (rear) wheel 104 interconnected by a frame 106. The front wheel 102 has an open centre 108 and comprises an annular rotor 110 engaged with the ground 112 when the bicycle 100 is ridden (for which purpose the rotor 110 is fitted with a tyre) and an annular stator 114 carrying the rotor 110. The rear wheel 104, which is smaller than the front wheel 102, has an open centre 116 and comprises an annular rotor 118 engaged with the ground 112 when the bicycle 100 is ridden (for which purpose the rotor 118 is fitted with a tyre) and an annular stator 120 carrying the rotor 118.

The frame 106 has a pivotal connection 122 with the stator 114 of the front wheel 102 whereby the front wheel may be turned (using transverse handlebars 124 mounted upon the stator 114 by way of a connection 126) relative to the rear wheel 104, for steering the bicycle 100 when ridden.

The bicycle 100 is equipped with pedals 128 on cranks 130 whereby the bicycle 100 may be driven when ridden, by way of a drive mechanism (described later herein with reference to FIG. 5) in a housing 132 forming part of the stator 114 of the front wheel 102.

A saddle 134 for a rider of the bicycle 100 is mounted upon the stator 120 of the rear wheel 104 by means of a connection 136.

Figure 2:
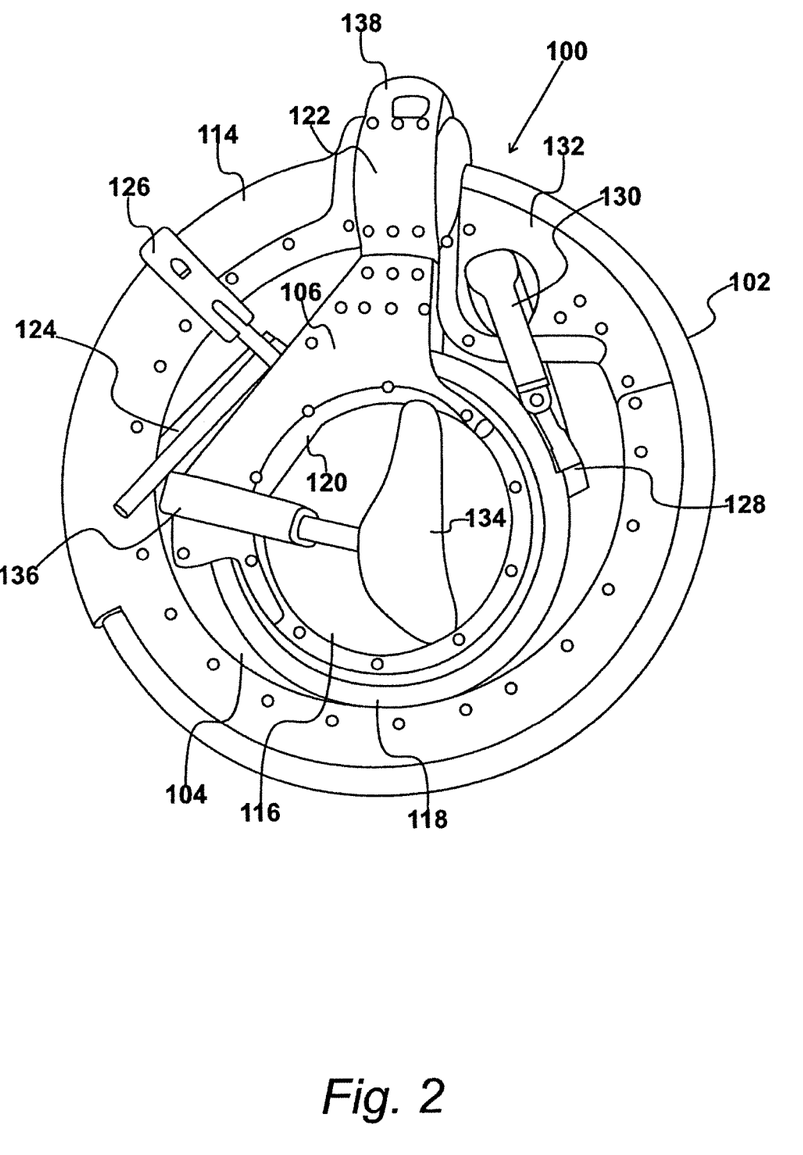
FIG. 2 illustrates the foldable bicycle of FIG. 2 in its folded configuration.

The bicycle 100 is folded as illustrated by FIG. 2 in the following way.

(a) The connection 136 whereby the saddle 134 is mounted upon the stator 120 of the rear wheel 104 is lockably rotatable about the stator 120. For riding the bicycle, the connection is locked so that the saddle 134 is fixed in position on the stator 120. To fold the bicycle 100, the connection 136 is released from its locked position, so that the connection 136 can rotate around the stator 120 to bring the saddle into a folded position within the open centre 116 of the rear wheel 104.

(b) The connection 126 whereby the handlebars 124 are mounted upon the stator 114 of the front wheel 102 is lockably rotatable about the stator 114. For riding the bicycle, the connection is locked so that the handlebars 124 are fixed in position on the stator 114. To fold the bicycle 100, the connection 126 is released from its locked position, so that the connection 126 can rotate around the stator 114 to bring the handlebars 124 into a folded position within the perimeter of the front wheel 102 and substantially within the open centre 116 thereof.

(c) The frame 106 is rotated about its pivotal connection 122 with the stator 114 of the front wheel 102 until the rear wheel 104 (with the turned-in saddle 134 inside it) lies within the open centre 108 of the front wheel 102.

(d) The pedals 128 have a lockably rotatable connection with the cranks 130 and the cranks 130 have a lockably rotatable connection with the housing 132 which connections can be released to enable the cranks 103 to be brought into line with one another, within the perimeter of the front wheel 102 and the pedals 128 can be folded inwards into the open centre 108 of the front wheel 102.

As can be seen from FIG. 2, the bicycle 100 in its folded configuration lies almost entirely within an envelope defined by the annular extent of the front wheel 102, and is thus very compact in both height and width. A handle 138 formed on the pivotal connection 122 projects by a small amount outward of the front wheel 102 in the folded configuration of the bicycle 100 so that the bicycle 100 may be conveniently handled in its folded configuration. In the riding configuration of the bicycle 100 the handle 138 is out of the way, within the open centre of the front wheel 102, as can be seen from FIG. 1.

It will also be understood that, inasmuch as the frame 106 as well as the rear wheel 104 lies within the open centre 108 of the front wheel 102 (rather than alongside as in the prior art to Ford) when the bicycle 100 is in its folded configuration, the transverse dimension of the folded bicycle 100 is minimised. In other words, bicycle 100 when folded is compact in height, width and thickness.

Figure 3:
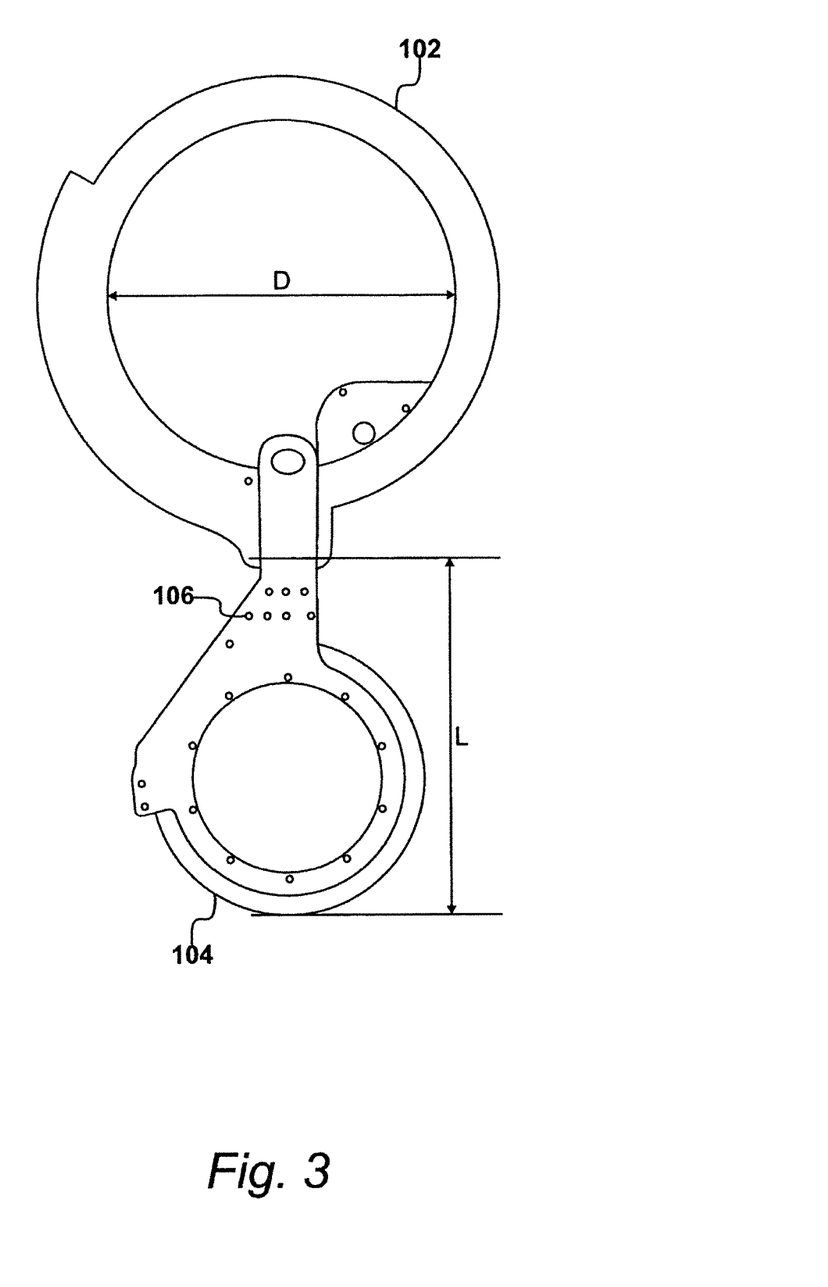
FIGS. 3 and 4 illustrate the frame and wheels of the bicycle shown in FIGS. 1 and 2, unfolded and folded respectively.
Figure 4:
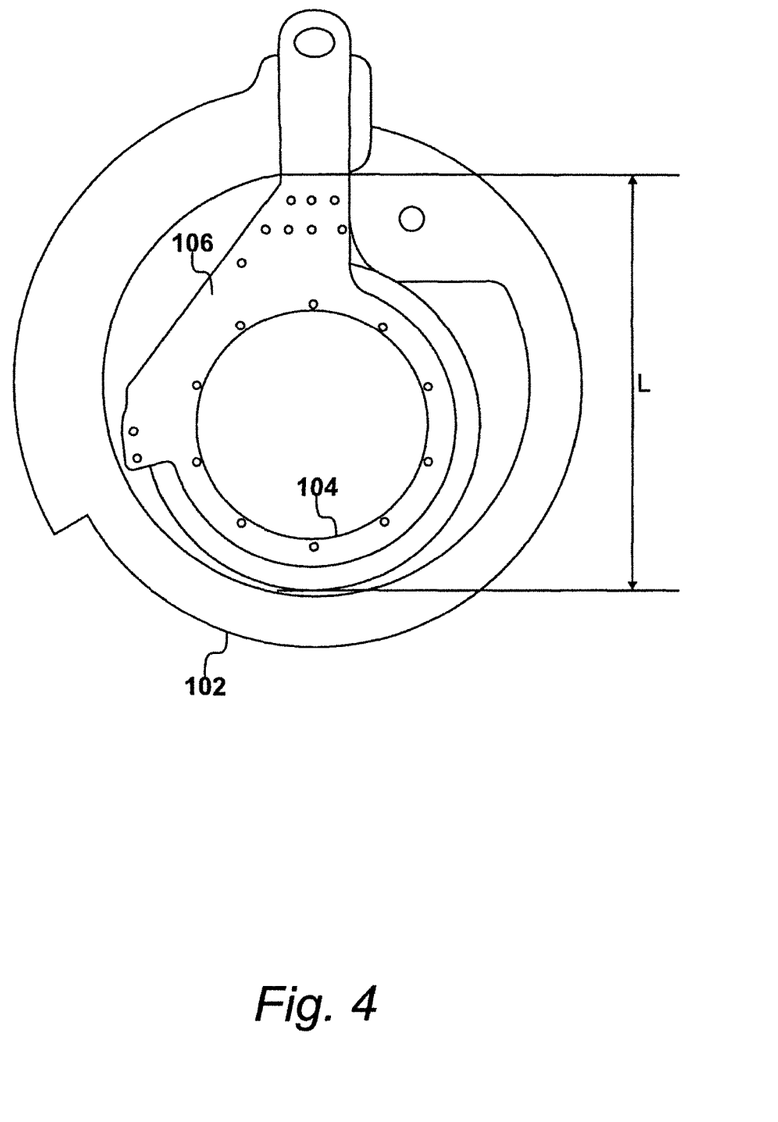

The wheels 102 and 104 and the frame 106 of the bicycle 100 should be dimensioned to enable the folded configuration to be most compact. The key requirement is that the internal diameter D of the larger wheel 102 must be large enough to accommodate the length L of the smaller wheel 104 on the frame 106, as illustrated by FIGS. 3 and 4. For simplicity of illustration, FIGS. 3 and 4 do not include the saddle, the handlebars or the cranks and pedals of the bicycle 100.

Figure 5:
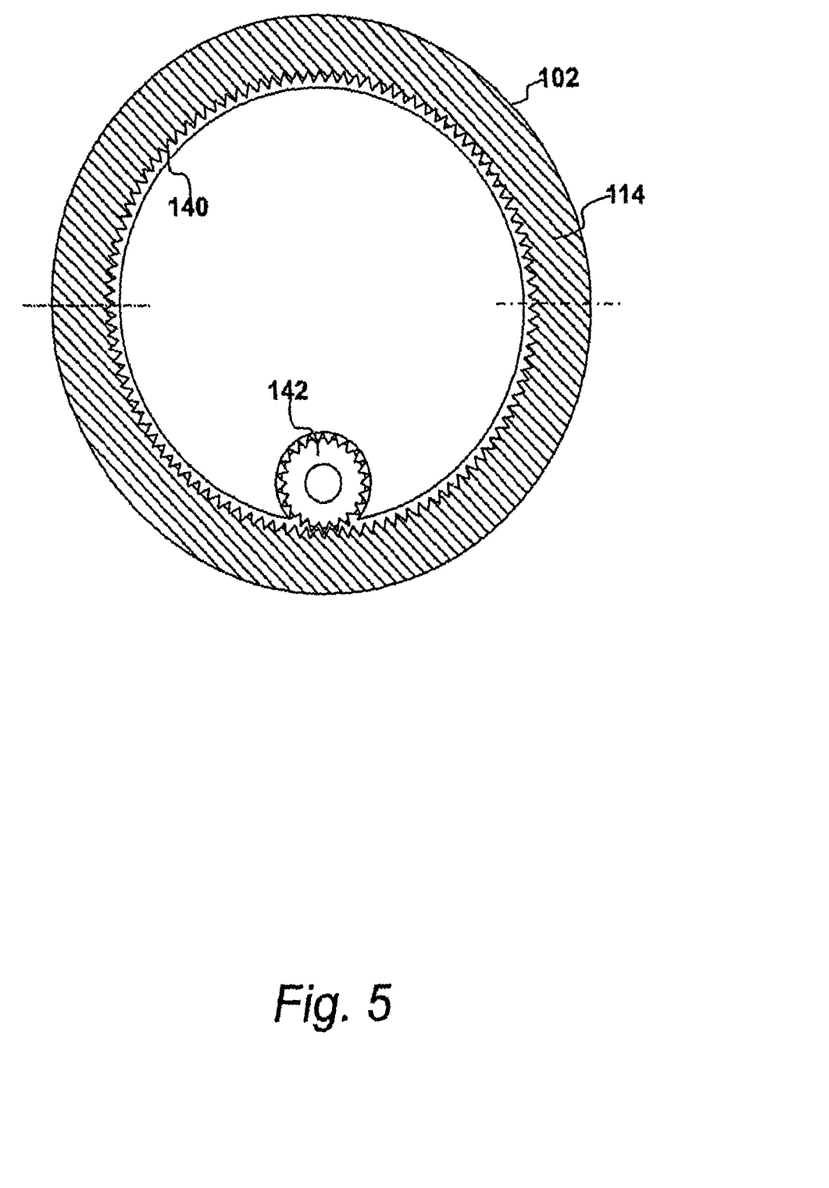
FIG. 5 illustrates a drive mechanism for the bicycle.
Figure 6:
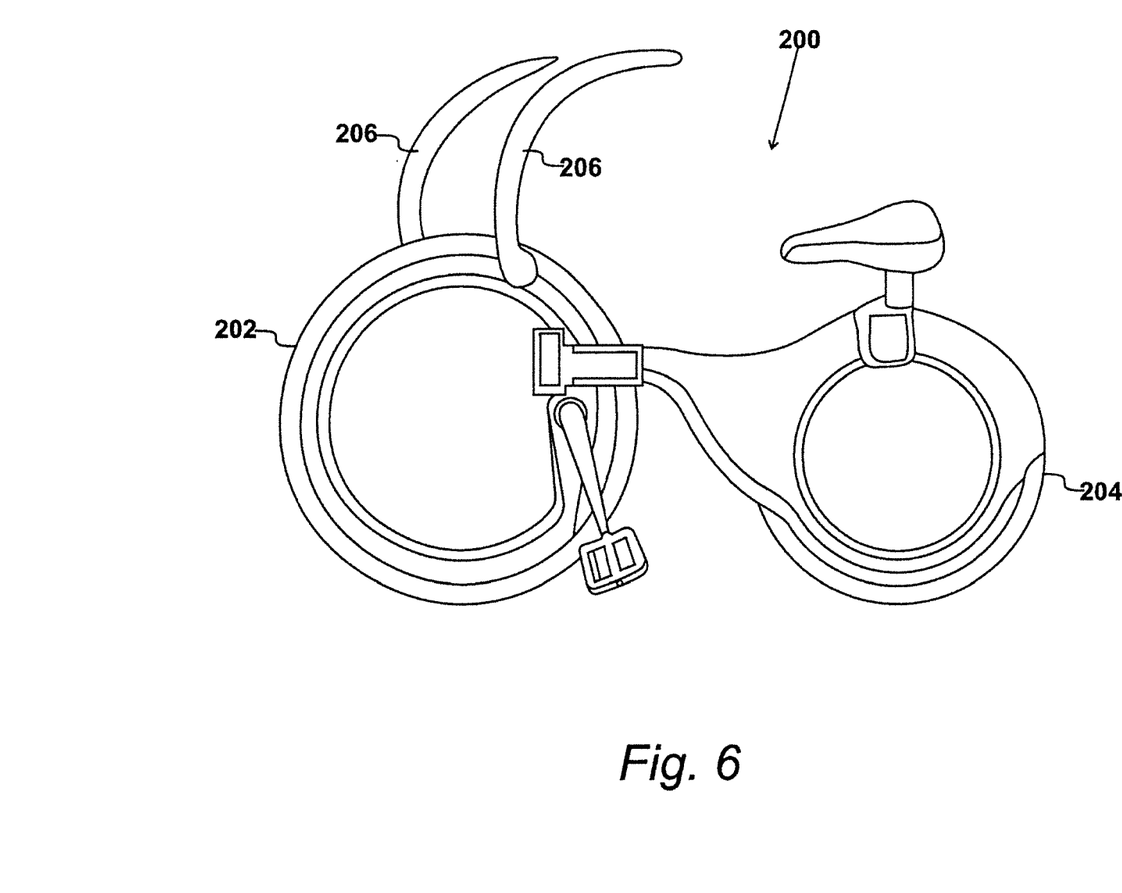
FIG. 6 illustrates, in its riding configuration, a variant of the bicycle shown in FIGS. 1 to 4.
Figure 7:
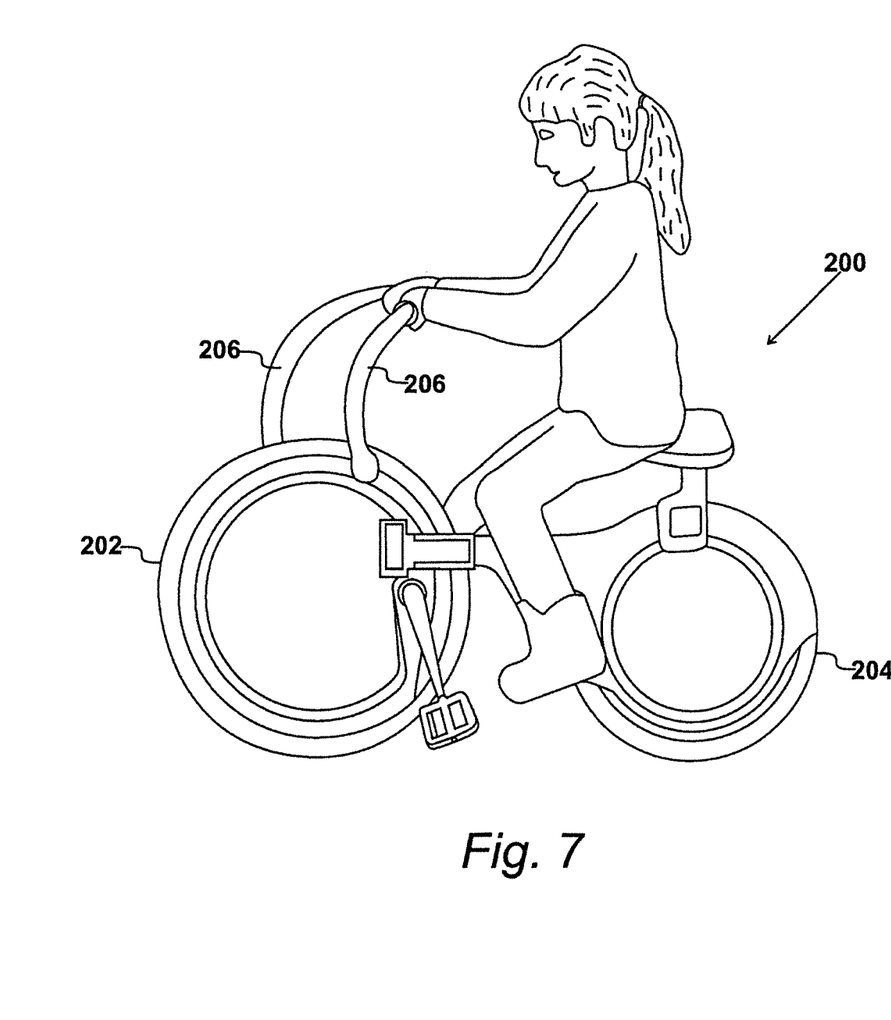
FIG. 7 illustrates the bicycle of FIG. 6 being ridden by a child.

Those skilled in the art will be readily able to construct a drive mechanism for the bicycle 100 from the following very brief outline with reference to FIG. 5. The annular rotor 110 of the front wheel 102 is formed with an annular internal gear 140. A pinion 142 is engaged with the internal gear and can be rotated to rotate the front wheel 102 and thereby drive the bicycle. The pinion 142 can be rotated by pedalling and/or by, for instance, a battery-powered electric motor (which may be located in the housing 132 shown in FIGS. 1 and 2 but not depicted in FIG. 5, for simplicity). It will also be understood that the pinion 142 may be one of a set of gears whereby the rate of rotation (and the tractive effort required to drive the bicycle) may be varied.

Figure 8:
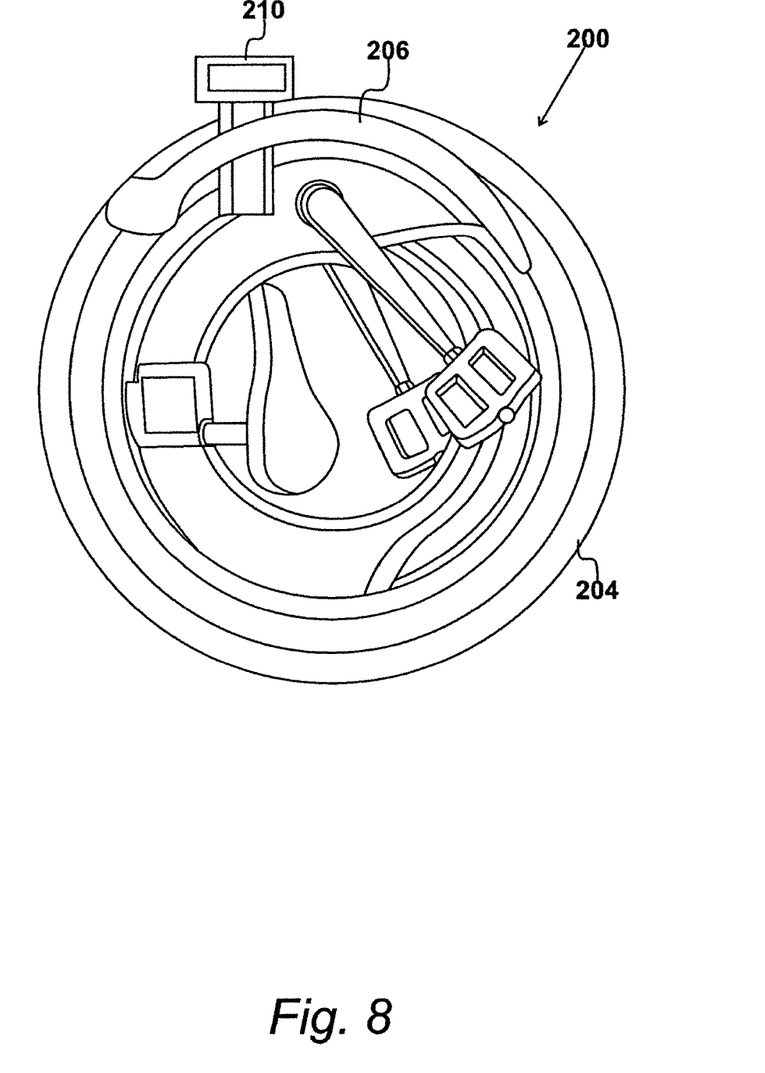
FIG. 8 illustrates the bicycle of FIGS. 6 and 7 in its folded configuration.

The bicycle 200 shown in FIGS. 6 to 9 is in all essential respects similar to the bicycle 100 of FIGS. 1 to 4, and as seen in FIG. 8 it has a generally similar folded configuration, with the open centre of a larger diameter front wheel 202 receiving within it a smaller diameter rear wheel 204. The handlebars 206 are arcuate rather than straight like the handlebars 124 (FIGS. 1 and 2). This arcuate form closely matches the curvature of the front wheel 202 of the bicycle, so that when the bicycle 200 is folded the handlebars 206 lie adjacent the front wheel 202.

Figure 9:
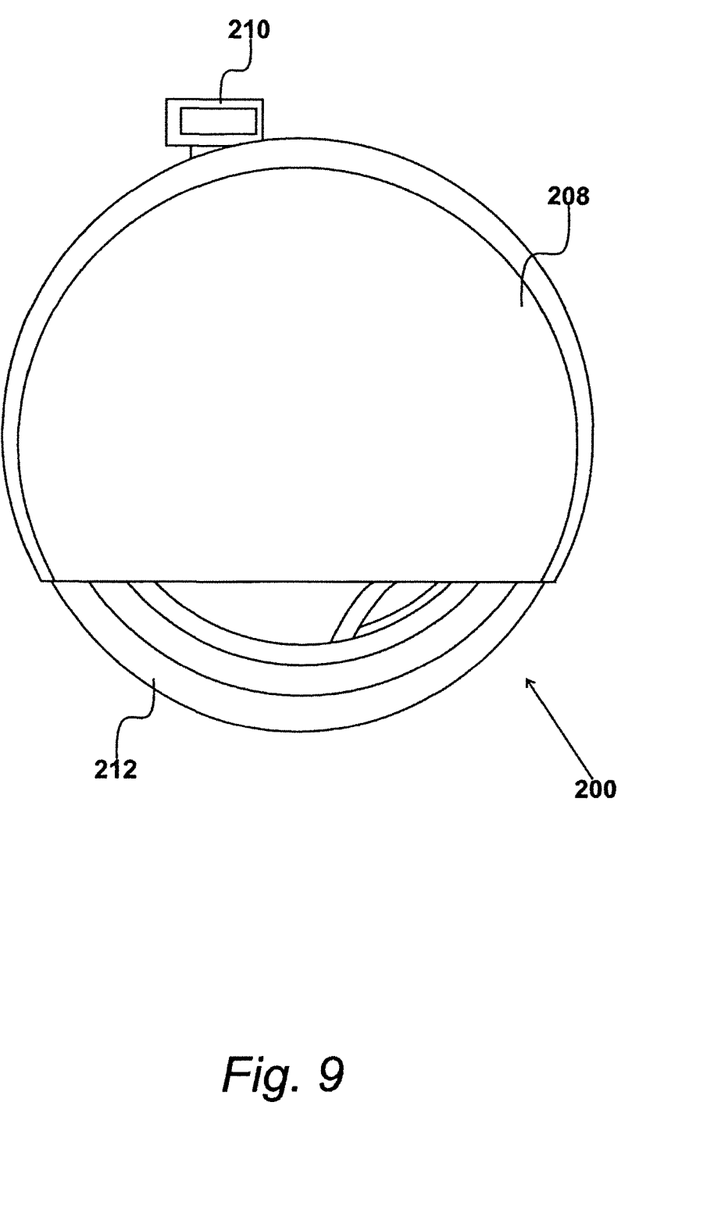
FIG. 9 illustrates the bicycle shown folded in FIG. 8, in a bag, for storage or transportation.

FIG. 9 illustrates how the bicycle 200 can in its folded configuration be placed on a bag 208 for storage or when, for instance, being carried in the boot of a car or in the luggage rack of an omnibus or train. The bag 208 has an opening for a handle 210 whereby the folded bicycle may be conveniently handled. And the bag 208 has a further opening through which the (tyred) rotor 212 of the larger wheel 202 projects, so that the folded and bagged bicycle 200 can be wheeled, using the handle 210. The bag 208 protects the user's hands and clothing against any dirt on the bicycle, and it will be understood that the bicycle 100 of FIGS. 1 to 4 can be similarly bagged.

Those skilled in the art will appreciate that a bicycle according to the invention may have its front wheel smaller than the rear wheel. It should also be understood that it is possible to provide a bicycle according to the invention with a smaller wheel that does not have an open centre, although an open centre for both wheels makes it easier to turn in parts such as the saddle.

The invention claimed is:

1. A foldable bicycle having a riding configuration and a folded configuration, which bicycle comprises:
   a first wheel,
   a second wheel,
   a frame which interconnects the first wheel and the second wheel,
   the first wheel having an open center of a first diameter, the first wheel comprises:
      an annular rotor engageable with a ground surface in a riding configuration of the bicycle and
      an annular stator carrying the annular rotor,
   the frame having a pivotal connection with the stator of the first wheel whereby the frame is pivotable relative to the first wheel for folding the bicycle,
   the frame and the second wheel connected to the frame having a combined length that is smaller than said first diameter, whereby in the folded configuration of the bicycle the frame and the second wheel together fit within the open center of the first wheel,
   the second wheel has an open center and comprises:
      an annular rotor engageable with the ground surface in the riding configuration of the bicycle and
      an annular stator carrying the annular rotor of the second wheel, and
   wherein the frame has a non-pivotal connection with the stator of the second wheel.

2. A foldable bicycle as claimed in claim 1 wherein the frame comprises an arm extending between the pivotal connection and the non-pivotal connection.

3. A foldable bicycle as claimed in claim 1 wherein in the riding configuration of the bicycle the first wheel is the front wheel and the second wheel is the rear wheel.

4. A foldable bicycle as claimed in claim 3 wherein the pivotal connection of the frame with the stator of the first wheel enables the first wheel to be turned to steer the bicycle in its riding configuration.

5. A foldable bicycle as claimed in claim 4 wherein the bicycle comprises handlebars connected to the stator of the first wheel for turning the first wheel to steer the bicycle in its riding configuration, the handlebars being mounted upon the stator of the first wheel by a rotatable connection that is locked for steering the bicycle in its riding configuration and releasable to allow the handlebars to be rotated to lie within the open center of the first wheel in the folded configuration of the bicycle.

6. A foldable bicycle as claimed in claim 1 wherein the bicycle comprises a saddle mounted upon the stator of the second wheel by a rotatable connection that is locked in the riding configuration of the bicycle and releasable to allow the saddle to be rotated to lie within the open center of the second wheel in the folded configuration of the bicycle.

7. A foldable bicycle as claimed in claim 1 wherein the rotor of the first wheel includes an annular internal gear engaged with a pinion mounted on the stator of the first wheel and being rotatable to drive the bicycle in its riding configuration.

8. A foldable bicycle as claimed in claim 7 wherein the bicycle includes gearing adjustable to vary the rotation of the pinion.

9. A foldable bicycle as claimed in claim 7 wherein the bicycle includes an electric motor connected to the pinion and operable to rotate the pinion.

10. A foldable bicycle as claimed in claim 7 wherein:
the bicycle includes a pair of cranks connected to the pinion and pedals operable to rotate the pinion,
the pair of cranks are mounted upon the stator of the first wheel by rotatable connections that are locked for rotating the pinion in the riding configuration of the bicycle and releasable to allow the cranks to be rotated to lie within the open center of the first wheel in the folded configuration of the bicycle, and
the pedals are mounted upon the cranks by rotatable connections that are locked for rotating the pinion in the riding configuration of the bicycle and releasable to allow the pedals to be rotated to lie within the open center of the first wheel in the folded configuration of the bicycle.

11. A foldable bicycle as claimed in claim 1 wherein the bicycle includes a handle for handling the bicycle in its folded configuration, which handle is connected to the stator of one of said wheels to lie within the open center of that wheel in the riding configuration of the bicycle and to project outwardly from said stator in the folded configuration of the bicycle.

12. A foldable bicycle as claimed in claim 11 wherein in the folded configuration the bicycle is accommodated in a bag with the handle projecting from the bag to enable the folded bicycle to be handled and the rotor of the first wheel projecting from the bag to enable the folded bicycle to be wheeled while folded.

13. A method of transporting when folded a foldable bicycle as claimed in claim 12 which method comprises the step of:
placing the bicycle in the folded configuration into a bag dimensioned and arranged to fit the folded bicycle and having a first opening whereby the folded bicycle may be handled and a second opening whereby the rotor of a wheel of the bicycle projects for wheeling the folded bicycle.

14. A foldable bicycle having a riding configuration and a folded configuration, which bicycle comprises:
a first wheel,
a second wheel,
a frame which interconnects the first wheel and the second wheel,
the first wheel having an open center of a first diameter,
the first wheel comprises:
an annular rotor engageable with a ground surface in a riding configuration of the bicycle and
an annular stator carrying the annular rotor,
the frame having a pivotal connection with the stator of the first wheel whereby the frame is pivotable relative to the first wheel for folding the bicycle,
the frame and the second wheel connected to the frame having a combined length that is smaller than said first diameter, whereby in the folded configuration of the bicycle the frame and the second wheel together fit within the open center of the first wheel, and
wherein in the riding configuration of the bicycle the first wheel is the front wheel and the second wheel is the rear wheel.

* * * * *